March 30, 1965   J. J. KLEIN   3,175,331
CLEANING AND SCOURING PAD
Filed July 13, 1964   2 Sheets-Sheet 1
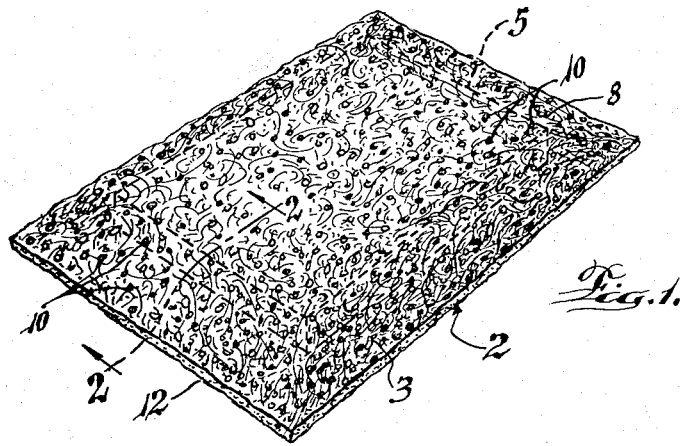
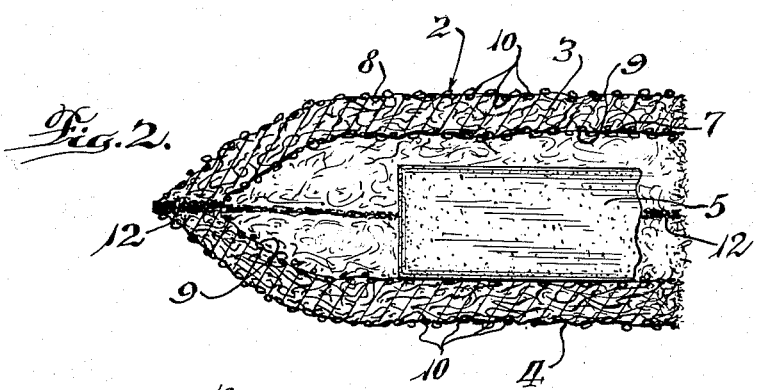
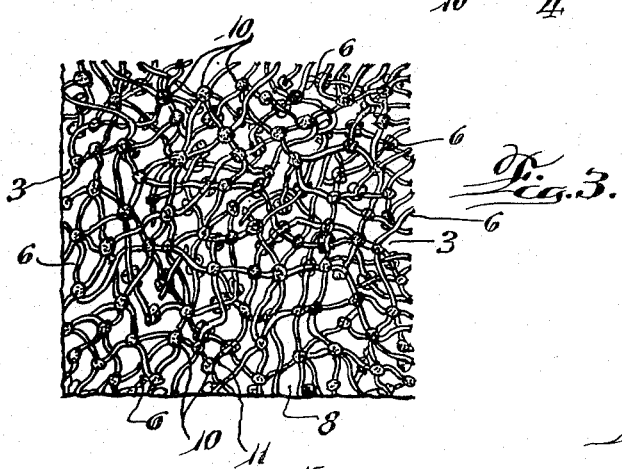
Inventor:
Joseph J. Klein
George A. Skoler
By Attorney March 30, 1965  J. J. KLEIN  3,175,331
CLEANING AND SCOURING PAD
Filed July 13, 1964  2 Sheets-Sheet 2

INVENTOR.
JOSEPH J. KLEIN
BY George A. Skoler
ATTORNEY

3,175,331
CLEANING AND SCOURING PAD
Joseph J. Klein, Glencoe, Ill., assignor to Union Carbide Corporation, a corporation of New York
Filed July 13, 1964, Ser. No. 382,421
3 Claims. (Cl. 51—400)

This application is a continuation-in-part of application Serial No. 158,510 filed Dec. 11, 1961.

This invention relates to cleaning and/or scouring pads. More particularly, this invention is concerned with cleaning and scouring pads comprising one or more fibrous batts, heat-sealed so as to be capable of having enclosed therein a solid washing composition, such as solid soap or detergent, and in which the outer surface of the pad has grit adhered thereto to provide a continuous, uninterrupted scouring surface extending over the entire outer surface of the pad.

Most particularly, this invention relates to a shaped cleaning and/or scouring pad comprising at least a non-woven, fibrous batt supplying at least a side surface for the pad. Preferably, the batt comprises non-absorbent and non-matting synthetic fibers arranged in three-dimensional, random arrangement. The opposite side surfaces of the batt are lightly impregnated with adhesive in an amount sufficient to bind together fibers at the surfaces. This amount of adhesive is insufficient to fill the voids between the fibers of the batt whereby the adhesive is concentrated at the area of the side surfaces of the batt. Adhesive on at least one of the side surfaces of the batt is a heat-sealable resin and adhesive which contains abrasive is on at least one outer surface of the pad formed by the batt. The periphery of the batt is in fusion contact with heat-sealable resin to form a thin, tapered heat-sealed edge extending about the periphery of the pad whereby to define the shape of the pad. Enclosed in the pad is a solid washing composition.

The cleaning and scouring pad of the present invention possesses versatility in use since it may be formed of one batt or two or more identical batts, or of different batts so associated that opposite surfaces of the batt(s) can be used in different types of cleaning or scouring jobs. For example, one surface of the batt may possess coarser grit than the other surface to provide a rougher scouring action. If desired, one surface may be totally free of grit so as to make it more suitable for gentle cleansing. In addition, when a multi-layer pad is employed, one batt may be replaced by a soft layer such as foam material, e.g., solid flexible polyurethane foam, which can be used for cleaning fine porcelain or other materials that should be protected against scratches. Particularly desirable polyurethane foam is one which contains a heat-sealable resin such as the polymeric vinyl acetate resins and/or the polymeric vinyl chloride resins, which resin material can be incorporated in the foam during its formation and is available for forming the heat-sealed edge surface. In addition, such a foam may be provided with the heat-sealable resin by sponging the resin into the foam and/or by coating the surface of the foam with the resin.

The fibrous batt used in making cleaning or scouring pads preferably comprises nonabsorbent, nonmatting fibers of various lengths from about one-half inch to two inches that are adhered to each other in three-dimensional, random arrangement. The three-dimensional, random arrangement of fibers provides many advantages in loft and resilience, but it will be understood that the batt of the present invention may vary from such fiber arrangement so long as any other fiber arrangement incorporates in the pad the advantages inherent from the use of the desired batts possessing the preferred fiber arrangement.

The batt may comprise synthetic fibers, metallic fibers, or various animal or vegetable fibers, either alone or mixed with each other. The metallic fibers that may be used, either alone or in combination with other fibers, include steel wool and stainless steel fibers. Particularly preferred are the synthetic fibers. The most satisfactory synthetic fibers are the thermoplastic synthetic fibers and include those made of nylon (e.g., polyhexamethyleneadipamide, polycarprolactam, and the like), polypropylene, polyester fibers (e.g., polyethyleneterphthalate, and the like), rayon, cellulose acetate, modacrylic fiber (a copolymer of vinyl chloride and acrylonitrile) commercially available under the trademark "Dynel," acrylic fiber (formed from a polymer of acrylonitrile) such as commercially available under the trademarks "Orlon" and "Acrilan," polyvinylidene chloride-polyvinyl chloride copolymer fibers, and the like fibers. The fibers may be curled, crimped and/or straight.

The denier of the fiber used may vary widely, depending upon the results desired. For example, heavy denier undrawn nylon is preferred for use in making coarse pads for rough scouring jobs. For fine scouring jobs the nylon may be of lighter denier, or may be mixed with various soft fibers.

The amount of adhesive sprayed on either surface of the fibrous layer is sufficient to bond the fibers together so as to form a self-sustaining batt when it is cut into a size suitable for a cleaning or scouring pad. The amount of adhesive is desirably sufficient to cause concentration of the adhesive at the area of the surface of the batt rather than in the center or middle of the batt. This is achieved by employing an amount of resin which avoids penetration of substantial amounts of adhesive to the center or middle of the batt. The bonding of the fibers prevents them from pulling out of the pad during cleaning or scouring operations and thereby insures dimensional stability of the pad for a much longer period of time than is possible with unbonded fibers. By concentrating the resin at the area of the surface, the batt possesses enhanced resilience, loft, and is significantly cheaper to produce.

Moreover, by concentrating adhesive at the surface coupled with heat-sealing of the marginal edge portions of the batt or batts, less adhesive is necessary to effect adequate interbonding of the fibers so as to avoid shredding of and distortion to the pad. Heat sealing the marginal edge(s) of the fibrous batt(s) brings the edge(s) together into a terminating thin tapered peripheral edge for the pad. The thin edge facilitates cleaning and scouring in corners and in crevices that cannot be reached effectively with pads having rounded or blunt peripheral edges. Another advantage of the thin edge portion is that when grit is embedded in adhesive bonding the fibers on the outer surfaces of the batt(s), the effective and operative scouring surface of the pad meets at the periphery thereof where the batt bonds to heat-sealed edge whereby to provide a continuous, uninterrupted scouring surface extending over the entire outer surface of the batt making up the pad.

The small amount of adhesive that passes through the interstices of the batt surface fibers, other than that which collects and concentrates at the area of the surfaces of the batt, wets the underlying fibers and promotes adherence of the fibers to each other at their spaced points of contact. The total amount of adhesive applied from both sides of the fibrous layer is not sufficient to fill the voids between the fiber or to penetrate to the opposite surface of the fibrous layer. The voids between the fibers are important in allowing water to flow into contact with the washing composition enclosed in solid form in the pad and in allowing the suds to pass outwardly of the pad into cleansing engagement with the object being cleaned or scoured. The dimensions of the washing composition should be too large to permit it to pass through the batt.

Therefore, the shaped cleaning and scouring pad of this invention contains one or more non-woven, lofty, fibrous batts, each having opposite side surfaces and each comprising non-absorbent and non-matting synthetic fibers arranged in three-dimensional, random arrangement. When more than one batt is employed in the formation of the pad they are typically utilized as a pair of superimposed batts. The opposite side surfaces of the batt are lightly impregnated with an adhesive in an amount sufficient to coat at least the outer fibers on the surface of the batt so that the outer fibers adhere to each other. The adhesive is concentrated at the area of the side surfaces and is provided in an amount which is insufficient to fill the voids between the fibers and to penetrate to the fibers on the opposite surface of the batt. The adhesive on at least one of the surfaces of the batt(s) is a heat-fusible resin. At least one outer surface of the batt is impregnated with an adhesive-containing abrasive. The peripheral end surfaces of the batt are fused into contact with the heat-sealable resin to form a thin, tapered heat-sealed edge extending about the periphery of the pad whereby to define the shape of the pad. The pad has enclosed therein a solid washing composition.

One of the distinct advantages of the pads of this invention resides not only in their effectiveness as a cleaning and scouring pad but also in their low cost. To be competitive with steel wool cleaning and scouring pads, a minimum amount of the expensive adhesive employed in forming the pad should be employed. This is achieved in the product of this invention by concentrating, as much as possible, the adhesive at and about the surfaces of the batt and fusing the marginal edges of the pad with a heat-sealed tapered edge so that an adhesive shell is formed about the batt in a manner so as to incapsulate the center of the batt. The remainder of the non-woven fibrous batt making up the pad is provided with a lesser amount of resin. As a result, it is possible to utilize in the pads of this invention, non-woven batts in excess of one-quarter of an inch up to two inches in thickness or more, yet providing within such batt, an amount of resin as low as one-quarter of that amount which has been employed in prior art pads having a thickness typically not greater than one-quarter inch. All of this is achieved without sacrifice in the scouring and cleaning capabilities of the pad. Moreover, as a result of the heat-sealed tapered edge, it is possible to make one-ply scouring pads, i.e., a pad made from only a single layer of non-woven batt, which possesses a sufficient thickness, typically in excess of one-quarter of an inch and preferably in excess of one-half an inch, which is capable of having incorporated therein substantial amounts of the solid washing composition. Thereby it is possible to produce an unusually attractive and effective scouring pad which is low in cost and which is competitive with soap-impregnated steel wool pads because of its extremely long life in cleaning and scouring of household utensils and the like surfaces.

The adhesive may comprise any fusible adhesive material, resinous or otherwise, which will fuse under heat and coalesce to bind the fibrous batts into a unitary pad. Such resins may be employed to form the heat-sealed edge. Examples of thermoplastic adhesives which may be used are polyvinyl alcohol, polyvinyl chloride or polyvinyl acetate or the copolymers thereof, and natural resinous adhesive materials such as rosin, and the like. It is also possible to use a rubbery adhesive binder composition such as butadiene-acrylonitrile copolymer latex having about 60 parts butadiene to 40 parts acrylonitrile, sold commercially by B. F. Goodrich Company under the trade name "Hycar Latex 1561" and cured to a stable resilient rubbery condition.

If the pad is to be used only as a wash pad, without any scouring action, both surfaces of the fibrous layer may be sprayed with the same adhesive. However, if any scouring action is desired, the surface of the fibrous layer that eventually becomes the outer surfaces of the pad is preferably sprayed with an adhesive in which grit is embedded. The scouring action depends upon the size of grit contained in the adhesive, the type of fiber, and the denier of fiber used. Silicon carbide and aluminum oxide are examples of suitable grit.

The adhesive used on the outer surface of the pad must have sufficient resistance to abrasion and water to hold the grit even under vigorous scouring action. The above thermoplastic resin may be so employed but, however, thermosetting resins typically exhibit preferred properties. For example, epoxy resin, such as the condensation product of epichlorohydrin and bisphenol A, with polyamide, such as the condensation product of dimerized fatty acids and alkylene polyamines and polyalkylene polyamines, may be used. The epoxy resins are desirable for their strength and resistance to abrasion and water, and polyamide is added to facilitate curing and to soften the resin so that it is not brittle. Triazine cross-linked acrylic resins are another example of a suitable class of adhesive. Other useable binders capable of holding grit therein include the aldehyde resins, such as, e.g., phenol-formaldehyde resins, reaction products of aldehydes with bifunctional amines, e.g., butylated-urea-formaldehyde resins, and condensation products of maleic and phthalic anhydrides with various glycols.

The pads of this invention may be produced by impregnating by spraying a non-woven batt, such as produced in a Curlator Rando-Webber, through one or more surfaces with the adhesive with or without abrasive therein. The batt is dried and simultaneously cut and heat-sealed by the use of a hot cutting edge having the configuration of the ultimate pad. The hot cutting edge cuts through one surface of the batt or batts to the underlying surface of the batt or batts while simultaneously forcing the cut edge of the batt or batts into itself or each other while simultaneously fusing the heat-sealable resin. As a result, the marginal edge portions of the batt or batts are caused to form the heat-sealed, thin-tapered edge described above.

One the other hand, after the final drying operation, the fibrous sheet may be cut into small batts either the size of the complete pad or twice said size. If two batts are superimposed then the washing composition, which may be soap or detergent in the form of a bar, flakes, pellets or granules, may be placed on a batt of the size of the completed pad and another batt of the same size is juxtaposed on the first batt with the surfaces having the thermoplastic adhesive facing each other, and with the washing composition between the batts confined within the lines along which the batts are to be heat sealed. The opposed batts are then heat-sealed along all four marginal edges in a single operation, to complete the pad and provide a thin tapered edge portion around the periphery of the pad. When the pad is made of a single-ply batt, it is particularly perferred to incorporate the solid washing composition into the batt by dipping the heat-sealed batt into a solution or paste of the washing composition and thereafter drying the pad to have incorporated within the interstices of the pad the dried solid washing composition.

In a further embodiment of this invention wherein the batt may be superimposed, if the batt is twice the size of the completed pad it can be folded along one center line of the batt and heat sealed along two edges perpendicular to said folded edge to form a pouch open at one end that may be later sealed in any suitable manner. Batts of pad size may be heat sealed along three edges to form a pouch, but preferably are heat sealed along all four marginal edges simultaneuosly after the washing composition is placed between two superimposed batts. The washing composition is placed in the pouch, and the open side thereof is sealed, preferably heat sealed, to form a cleaning or scouring pad that has the cleansing power of soap or detergent and the abrasive power of any selected grit.

In the present invention, it is particularly preferred in the formation of a single-ply pad to incorporate the solid washing composition as a paste or solution into the interstices of the batt comprising the pad. However, in the utilization of a multi-layer superimposed batt arrangement for the formation of the pad, it is particularly desirable to incorporate either a bar, flakes, pellets, or granules form solid washing composition between at least two of the superimposed batts comprising the pad. In any event, the dimensions of the solid washing composition incorporated in the pads of this invention should be sufficiently large to preclude its passage through the batt while as a solid when the pad is being utilized for washing and scouring purposes.

In order to provide a quick sudsing action, the outer surface of the pad may be coated with a soap or detergent solution capable of an initial flash sudsing. The soap or detergent solution is preferably sprayed on the outer surface of the pad, but may be applied in any suitable manner.

Structures by means of which the above mentioned and other advantages of the invention are attained is further described below, which when taken in conjunction with the accompanying drawings show illustrative embodiments of the invention.

FIGURE 1 is a perspective view of a scouring pad embodying the invention with the washing composition in the form of a bar of soap indicated in dotted lines;

FIGURE 2 is an enlarged fragmentary cross sectional view taken along the line 2—2 of FIGURE 1; and FIGURE 3 is a magnified fragmentary top plan view of the fibrous batt used in making the pad of FIGURES 1 and 2.

Figure 4:
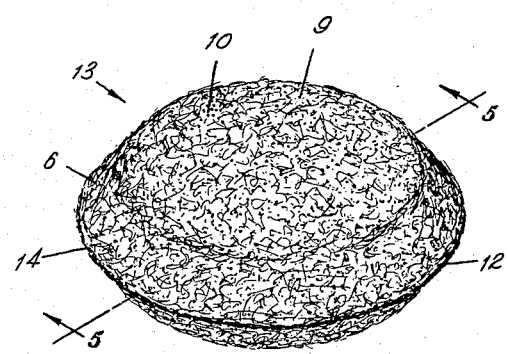
FIGURE 4 is a perspective view of a single-ply scouring pad encompassed by this invention.

With respect to FIGURES 1 to 3, a pad 2 comprises two fibrous batts 3 and 4, each having opposite end and side surfaces, with a bar 5 of soap between said batts. The bar 5 may be any suitable soap or detergent, and may be in the form of a bar, as shown, or in the form of flakes, pellets or granules. The fibrous batts are sufficiently porous to permit the washing composition to perform its cleaning function when the pad is dipped in water and then rubbed over the surface to be cleaned or scoured. The dimensions of the washing composition, regardless of whether it is in the form of flakes, granules or pellets, are too large to permit it to pass through either batt.

As shown best in FIG. 3, each batt comprises a plurality of nonabsorbent, nonmatting fibers 6 of various lengths, from about one half inch to two inches, that are preferably intermingled in random arrangement so that they lay at various angles, both horizontally and vertically, to form a three-dimensional batt with the individual fibers contacting each other at separate points throughout the batt. Although the random fibrous arrangement is preferred, any other fiber arrangement may be used, if desired.

It is important, because of the use for which the pad is intended, that the fibers used be resistant to abrasion and to water. It is preferred to use various thermoplastic synthetic fibers or metal fibers, either alone or mixed with each other. The thermoplastic synthetic fibers include nylon, polypropylene, polyester, rayon, cellulose acetate, "Dynel," "Orlon," and "Saran." One of the factors that determines the scouring action of the pad is the denier of the fibers used. For general scouring purposes, heavy denier undrawn nylon fibers are preferred. Thinner fibers may be used when the pad is to be used for cleaning rather than for scouring.

The opposite side surfaces 7 and 8 of the fibrous layer are lightly sprayed with adhesive 9 and 10, respectively, for different purposes. The amount of adhesive on each surface is sufficient to coat at least the outer fibers on said surface of the fibrous layer so that said outer fibers adhere to each other, but is not sufficient to fill the voids between the fibers or to penetrate to the fibers on the opposite surface of the fibrous layer. In this way, the adhesive is more concentrated at the area of the opposite side surfaces 7 and 8 than it is in the middle of the batt. In addition to adhering the fibers together at their spaced points of contact, the adhesive 9 sprayed on the surface 7 is intended to permit the juxtaposed surfaces of the fibrous batts to be integrally joined by heat sealing. Accordingly the adhesive 9 is one that will fuse under heat and coalesce. In heat sealing, the marginal edge portions of the batts that extend beyond the outer edges of the bar of soap confined therebetween are brought together to form a thin tapered peripheral edge portion, as shown at 12 in FIG. 2 of the drawings.

Suitable adhesives may be a thermoplastic resin, either natural or synthetic, or synthetic rubber compositions. Examples of thermoplastic adhesives that may be used for adhering the fibers together at their spaced points of contact and for heat sealing the edges of two juxtaposed fibrous batts are polyvinyl alcohol, polyvinyl acetate, polyvinyl chloride; and a copolymer of polyvinyl chloride and polyvinyl acetate, sold by B. F. Goodrich Co. under the trade name "Geon 576." Another suitable adhesive is a synthetic rubber composition comprising butadiene-acrylonitrile copolymer latex having about 60 parts butadiene to about 40 parts acrylonitrile, sold by B. F. Goodrich Co. under the trade name "Hycar Latex 1561" and cured to a stable resilient rubbery condition. Natural resinous adhesive, such as rosin, for example, may also be used.

The surface 8 of the fibrous layer is sprayed with an adhesive 10 in which an abrasive material 11, such as grit, may be embedded. The abrasive material extends over the entire area of surface 8 to provide a scouring surface that is effective over the entire outer surface of the pad. Examples of suitable grit are silicon carbide or aluminum oxide. The grit will vary in size according to the scouring job to be done. The adhesive 10 must lock the abrasive 11 in place, and therefore must be resistant to water and to abrasion, to enable the completed pad to stand up under rigorous scouring action without disintegrating or losing its abrasive material. Examples of adhesives 10 that may be sprayed on surface 8 are epoxy resin, acrylic resin, and various aldehyde resins. Epoxy resin is very desirable because of its strength in addition to its water and abrasion resistance. Preferably, the epoxy resin is mixed with about 50 weight percent polyamide to facilitate curing of the epoxy resin and to soften it so that it is not too brittle for its intended use. If the pad is to be used for washing, rather than scouring, the abrasive material may be omitted, and the same adhesive may be applied to both surfaces 7 and 8 of the fibrous layer.

After both surfaces of the fibrous layer are sprayed and the adhesive has dried, the fibrous layer is cut into pad size batts. Washing composition, which may comprise soap, detergent or a mixture of soap and detergent, is placed on the surface 7 of one batt, and a second batt is juxtaposed on the first batt with its surface 7 facing the surfaces 7 of the first batt on the opposite side of the washing composition. The washing composition, which may be in the form of a bar, flakes, pellets or granules, is spaced from the outer edges of the batts so that said outer edge portions of said batts may be superimposed. The outer edge portions i.e., the end surfaces, of the superimposed batts 3 and 4 are then heat sealed to form a tapered peripheral edge portion, as indicated at 12, and to completely enclose the washing composition. As can be seen in FIG. 2, the batts 3 and 4 each terminate at their peripheral end surfaces where they are heat-sealed in contact with each other, the numeral 12 being used to identify the heat-sealed edge formed at the contacting peripheral end surfaces. The heat sealing is accomplished by any conventional means, preferably by an electronic heat sealing device which provides heat by means of radio frequency waves. Other suitable conventional heat sealing means may be employed, if desired. The fibers and the adhesive are fused by the heat and pressure of the heat sealing means to prevent any leakage through the sealed edges of the pad.

The washing composition enclosed in the pad is in the form of a solid or solids of such size that it cannot be displaced from the interior of the pad. The pad is sufficiently porous to permit the interaction between the washing composition and water to provide the desired washing or scouring action whenever the pad is wetted with water and rubbed against articles to be washed or scoured. The cleansing action of the washing composition and the abrasive action of the grit embedded in the adhesive on the entire outer surfaces of the pad down to the periphery thereof, as shown in FIG. 2, combine to produce an excellent scouring action with very little wear on the pad. The thin tapered peripheral edge portion of the pad facilitates cleaning and scouring in crevices and corners. The adhesive bond holds the fibers and the abrasive in place so that the fibers cannot be pulled out of the pad during the scouring operation. Accordingly, the useful life of the pad is much longer than pads in which the fibers are not bonded by adhesive.

A soap or detergent solution having a flash sudsing action upon contact with water may be sprayed or dipped into the outer surface of the pad to provide an initial flash sudsing action when the pad is first wetted. A suitable soap solution that may be provided in the pad is triethanolamine oleate dissolved in an alcohol and water mixture.

Figure 5:
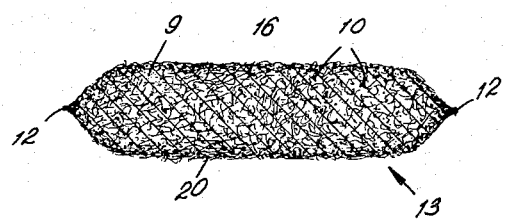
FIGURE 5 is a cross-sectional view taken along line 5—5 of FIGURE 4.

With respect to the single-ply pad of this invention, as depicted in FIGURES 4 and 5, a single layer or sheet of the non-woven batt 13 containing the randomly-arranged fibers 6 (described above) has sprayed over one or both side surfaces 16 and 20, heat-sealable adhesive 9 in an amount sufficient to form the desired heat-sealed edge 12 extending about tapered periphery 14 of the pad. In addition, heat-seal adhesive 9, along with abrasive containing adhesive 10, is concentrated at about the side surfaces 16 and 20 of batt 13 whereby with heat-sealed edge 12 to encapsulate the central portion of the batt. It is particularly desirable in the practice of this invention that when the heat-sealable adhesive is applied to the same side surface as the abrasive containing adhesive, that the latter adhesive overlay the heat-sealable adhesive, i.e., the abrasive containing adhesive should be sprayed over the heat-sealable adhesive. It is found that better scouring action without severe scratching (particularly with aluminum utensils) results.

Although I have described a preferred form of the invention in considerable detail, it will be understood that the description thereof is intended to be illustrative, rather than restrictive; as many details may be modified or changed without departing from the spirit or scope of the invention. Accordingly, I do not desire to be restricted to the exact details disclosed.

What is claimed is:

1. A shaped cleaning and scouring pad comprising at least a non-woven, fibrous batt supplying at least a side surface for the pad, which batt comprises non-absorbent fibers arranged in three-dimensional random arrangement and possesses opposite side surfaces which are lightly impregnated with adhesive in an amount sufficient to bond fibers at the surfaces, said amount of adhesive being insufficient to fill the voids between the fibers of the batt whereby the adhesive is concentrated at the area of the side surfaces of the batt, adhesive which is provided on at least one of the side surfaces of the batt is a heat-sealable resin and adhesive which contains abrasive is provided on at least one outer surface of the pad formed by the batt, the periphery of the batt is in fusion contact with heat-sealable resin to form a thin tapered heat-sealed edge extending about the periphery of the batt whereby to define the shape of the pad, and enclosed in the pad is a solid washing composition.

2. A shaped cleaning and scouring pad comprising one non-woven fibrous batt supplying the side surfaces for the pad, which batt comprises non-absorbent fibers arranged in three-dimensional random arrangement and possesses opposite side surfaces which are lightly impregnated with adhesive in an amount sufficient to bond fibers at the surfaces, said amount of adhesive being insufficient to fill the voids between the fibers of the batt whereby the adhesive is concentrated at the area of the side surfaces of the batt, adhesive which is provided on at least one of the side surfaces of the batt is a heat-sealable resin and adhesive which contains abrasive is provided on at least one outer surface of the pad formed by the batt, the periphery of the batt is in fusion contact with heat-sealable resin to form a thin tapered heat-sealed edge extending about the periphery of the batt whereby to define the shape of the pad, and enclosed in the pad is a solid washing composition.

3. A shaped washing and scouring pad comprising a pair of superimposed, non-woven, lofty, fibrous batts each having opposite end and side surfaces and comprising non-absorbent and non-matting synthetic fibers arranged in three-dimensional random arrangement, opposite side surfaces of said fibrous batts being lightly impregnated with adhesive in an amount sufficient to coat at least the outer fibers on the surface of the batts so that said outer fibers adhere to each other and said adhesive is concentrated at the area of said side surfaces, but not sufficient to fill the voids between the fibers and to penetrate to the fibers on the opposite surface of the batt, the adhesive on at least one of said surfaces being heat-fusible, an outer surface of the pad being impregnated with adhesive containing abrasive, the peripheral end surfaces of said batts being in contact with each other and being heat-sealed to form a thin, tapered heat-sealed edge extending about the periphery of said batts to define the shape of the pad, and said pad having enclosed therein a solid washing composition.

References Cited by the Examiner
UNITED STATES PATENTS

| | | | |
|---|---|---|---|
| 2,327,199 | 8/43 | Loeffler | 51—293 |
| 2,572,150 | 10/51 | Hood et al. | 15—209.5 |
| 2,958,593 | 11/60 | Hoover et al. | 51—295 |
| 3,014,233 | 12/61 | Gibbons | 15—568 |

LESTER M. SWINGLE, *Primary Examiner.*